Figure 1:
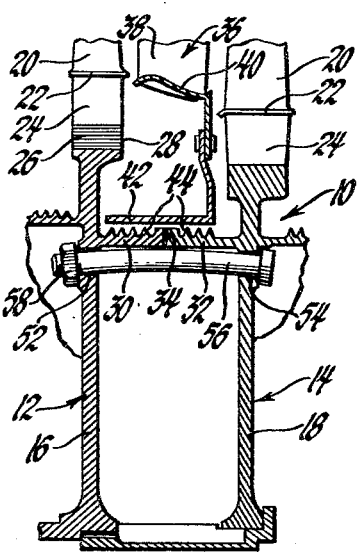

Dec. 11, 1962 H. W. WELSH 3,067,980
ROTATING MECHANISM
Filed Nov. 19, 1958

INVENTOR.
Harvey W. Welsh
BY
Robert E. McCollum
ATTORNEY

United States Patent Office 3,067,980
Patented Dec. 11, 1962

3,067,980
ROTATING MECHANISM
Harvey W. Welsh, Indianapolis, Ind., assignor to General Motors Corporation, Detroit, Mich., a corporation of Delaware
Filed Nov. 19, 1958, Ser. No. 774,912
10 Claims. (Cl. 253—39)

This invention relates to means for securing a plurality of rotating mechanisms together.

More particularly, this invention relates to a turbine or other rotating assembly of the axial flow type having multiple stages wherein the stages are secured to each other by means of a number of circumferentially spaced tie-bolts. While tightening of the tie-bolts normally will set up equal tension stresses on the radially inner and outer fibers thereof, rotation of the turbine creates an unbalance in the stresses because of centrifugal force acting on the tie-bolts causing them to bend. In constructions of this type prior to this invention, this unbalance in stresses was provided for primarily by using bolts of sufficient size and number, and by sufficient torqueing of the tie-bolt head. However, this was objectionable from a weight and assembly standpoint as well as from a stress distribution standpoint with respect to the rotating member since the discontinuities produced by the large holes in the rotating member introduced undesirable stress patterns into the member. Since essentially the same tensile stress is used in tightening the bolts regardless of bolt diameter, the use of smaller bolts and therefore smaller holes in the disk presents a lesser problem with respect to the member stress patterns.

This invention therefore relates to the construction of suitably sized tie-bolts for securing turbine rotor wheels together wherein centrifugal force acting thereon during rotation of the turbine relieves any unbalance in the stresses induced in the bolts instead of creating an unbalance as previously described.

Therefore, it is an object of this invention to provide tie-bolts of the character described wherein any unbalance in the stresses induced in the inner and outer fibers of the bolts during the tightening thereof in connection with the assembly of the turbine are relieved upon rotation of the turbine.

Other features, advantages and objects will become apparent by reference to the detailed description of the invention and to the drawings wherein there is shown the preferred embodiments of this invention.

Figure 2:
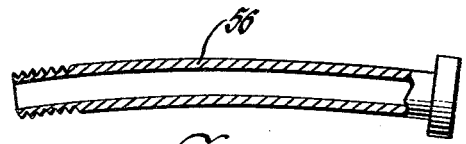
Figure 3:
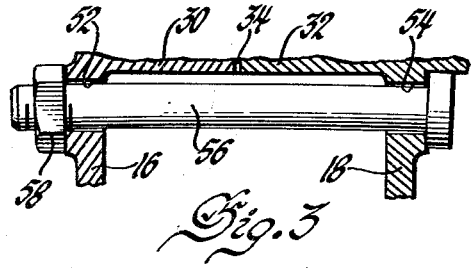
Figure 4:
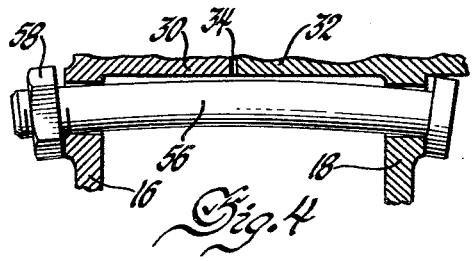
Figure 5:
Figure 6:
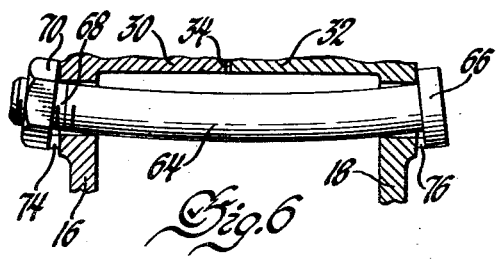
Figure 7:
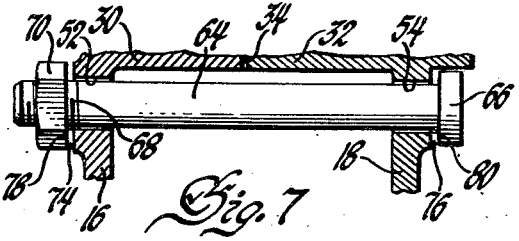

Referring to the drawings,

FIGURE 1 is a cross-sectional view of a portion of a turbine illustrating this invention, FIGURES 2, 3 and 4 illustrate the preferred construction and shapes or forms of a tie-bolt embodying this invention in its free, secured and rotating states, respectively, FIGURES 5, 6 and 7 correspond to the construction of FIGURES 2, 3 and 4 and illustrate the construction and shapes of another embodiment of the tie-bolt of FIGURES 1–4, and FIGURES 8 and 9 illustrate further embodiments of the invention.

Referring now to the drawings and more particularly to FIGURE 1, there is illustrated therein a portion of a turbine 10 of the axial flow type having a number of rotor stages of which two, 12 and 14, are shown including rotor wheels or disks 16 and 18. Each of the disks 16 and 18 at their outer peripheries has mounted thereon a plurality of circumferentially spaced rotor blades 20 having platforms 22 and stalks 24 formed with conventional fir-tree inserts 26 for cooperation with fir-tree slots 28 in the rotor disks. While the connection between the stalks and the disks is shown as of the fir-tree type, any conventional connecting means may be used since the details thereof do not form a part of this invention. The fir-tree connections may be maintained in axial alignment by suitable pins (not shown) equally spaced around the circumference thereof, or by any other suitable means.

The disks 16 and 18 are each provided with axially extending annular ribbed flanges 30 and 32, respectively, splined together at their abutting edges by a face spline 34. Positioned between and cooperating with the rotor blade assemblies is a stator vane assembly 36 supported in a suitable manner (not shown) from the engine casing and having a plurality of circumferentially spaced stator vanes 38 secured to an inner shroud ring 40. Secured to and suspended from shroud ring 40 is a ring flange 42 constituting the stationary portion of a labyrinth seal, the rotating portion consisting of the upstanding ridges 44 formed on each of the flanges 30 and 32. Both disks 16 and 18 may be splined or otherwise suitably connected to a shaft (not shown) for rotation thereof.

Referring now to the details of the stage connecting means embodying this invention, both of the rotor disks 16 and 18 are provided with an equal number of axially aligned circumferentially spaced apertures or openings 52 and 54 through which an equal number of tie-bolts 56 are adapted to be inserted and secured thereto by nuts 58 for rigidly connecting the stages of the turbine together. Bolts 56 are of a slightly smaller diameter than that of the openings 52 and 54 to permit a very slight bending of that portion of the bolt in the openings under the effect of centrifugal force, as will be clear later. The bend of the bolts in the figures has been exaggerated for a clearer showing thereof. While the number of tie-bolts to be used will depend upon the size of the turbine and the number of stages that are secured together, in an installation as shown in FIGURE 1, for example, 16 stainless steel hollow tie-bolts of 3/16" diameter would be sufficient.

As stated previously, in constructions (not shown) prior to this invention using straight bolts, tightening of the nuts upon the bolts induces tension stresses substantially uniform over any cross section of the bolts. However, rotation of the turbine causes a centrifugal force to act upon the bolts bending them outwardly and therefore creating an unbalance in these stresses. The bending by the centrifugal force creates additional tension stress in the outer fibers of the bolt (relative to the turbine axis) and compressive stresses in the inner fibers which reduces the net tensile stress on the inner fibers. It is, therefore, the construction and shape of the tie-bolts to relieve this unbalance in stresses created therein upon rotation of the turbine to which this invention is directed.

One construction of a tie-bolt accomplishing this objective is shown in FIGURES 1, 2, 3 and 4. Referring to FIGURE 2, a normally straight tie-bolt 56 is initially bent until the desired curvature is obtained, this curvature being that which the bolt would assume under the effect of centrifugal force acting thereon after being tightened in place, which curvature can be determined by test or by suitable calculations. The stresses induced therein are subsequently relieved by heat treating, the tie-bolts then having a free state shape as shown in FIGURE 2. The bolts 56 are then inserted through the apertures 52 and 54 of the turbine disks as shown in FIGURE 1, and the nuts 58 threaded thereon and tightened. As seen in FIGURE 3, tightening of the nuts induces equal tensile stresses on the inner and outer fibers of the bolts and tends to straighten the bolts. This straightening induces additional unequal compression and tension stresses in the bolts since it requires a greater tension stress to bend the radial innermost fibers of the bolt than the compressive stress necessary to bend the radial outermost fibers. Subsequently, however, as shown in FIGURE 4, rotation of the turbine and tie-bolts subjects the bolts to a centrifugal force causing the bolts to be bent back to the initially bent shape shown in FIGURE 2. The return of the bolts to their initially bent shape therefore relieves the bolt of the unbalance in stresses induced therein by the tightening of the nuts. Thus under normal running conditions of the turbine, the preloaded unbalance in stresses caused by the tightening of the initially curved bolts are relieved by the effect of centrifugal force, increasing the failure life of the tie-bolts.

Another construction of a tie-bolt for use with the turbine of FIGURE 1 is shown in FIGURES 5, 6 and 7. Referring to FIGURE 5, each of the bolts 64 is shown in its free state as being substantially straight instead of as shown in FIGURE 2. Each bolt is provided with a head 66 and threads 68 for cooperation with a nut 70. However, in this embodiment, the facing portions of the nut 70 and head 66 are each adapted to cooperate with a single axial projection or nipple 74 and 76 formed integrally with or secured to the face portions 78 and 80 of turbine disks 16 and 18 adjacent the radial innermost portion of each of the apertures 52 and 54. Upon tightening of the nut upon the bolt, the abutment of only the one portion of the head and nut upon the projections 74 and 76 causes the bolt to be bent inwardly toward the turbine axis to the shape shown in FIGURE 6 producing an unbalance in the tension and compression stresses induced in the bolt due to the tensile stress on the radial innermost fibers of the bolt being greater than the compressive stress on the radial outermost fibers in a manner similar to that of the FIGURE 3 construction. Therefore, upon subsequent rotation of the turbine and tie-bolts, centrifugal force acting on the tie-bolts 64 will cause them to be bent back to their initial straight shape as shown in FIGURE 7 relieving the unbalance in the tension and compression stresses induced in the bolts by the tightening process. Thus, the tie-bolts are relieved of preloaded unbalanced stresses, and again failure life is increased.

Figure 8:
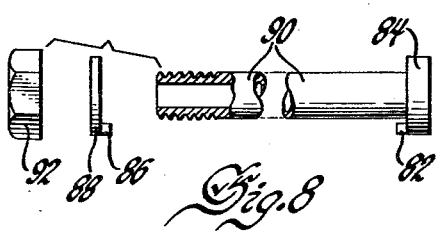
Figure 9:
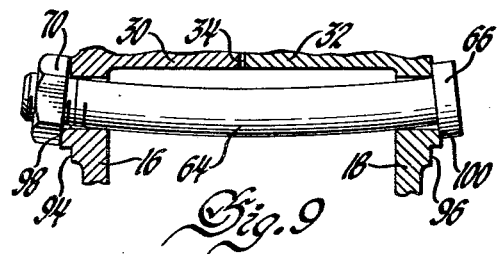

While the axial projections 74 and 76 have been illustrated as being formed on the faces of the turbine disks, it will be clear that the projections could also be formed as shown in FIGURES 8 or 9. In FIGURE 8, one projection 82 is formed on the radial innermost portion of head 84, while the opposite projection 86 is formed on a washer 88 adapted to be positioned over the bolt 90 and between the nut 92 and the turbine disk so as to permit the same operation as in the FIGURES 5–7 construction. In FIGURE 9, the outer axial faces 94 and 96 of turbine disks 16 and 18 are formed with non-radial surfaces 98 and 100 to also permit the same operation as in FIGURES 5–7.

From the foregoing it will be seen that the embodiments illustrated and described herein provide a control for the stresses induced in turbine stage connecting tie-bolts. It will further be seen that this invention provides an axial flow turbine multi-stage connecting means permitting the use of smaller tie-bolts. It will also be seen that this invention provides a more accurate control of the stresses induced in the bolts.

While the preferred embodiments of this invention have been illustrated in connection with a turbine construction as shown in FIGURE 1, it will be clear to those skilled in the art that many modifications can be made thereto without departing from the scope of the invention.

I claim:

1. A rotating assembly comprising a plurality of rotatable radially extending members, and axially extending adjustable tightening means connecting said members together, said means having radially inner and outer portions, said portions having unequal stresses induced therein upon tightening of said means with said inner portions having a greater tensile stress induced therein than the outer portions prior to rotation of said members, said portions being subjected to the effect of centrifugal force upon rotation of said members, centrifugal force on said portions upon rotation of said members substantially relieving said portions of said unequal stresses.

2. A rotating assembly including a plurality of spaced rotatable disks, and bolt and adjustable nut means securing said disks together for simultaneous rotation, tightening adjustment of said nut means preloading said bolt means creating a greater tension in the radially inner fibers of said bolt means than the outer fibers thereof, rotation of said disks subjecting said bolt means to the effect of a centrifugal force substantially equalizing the tension on both radial inner and outer fibers of said bolt means.

3. A rotating assembly including a plurality of spaced rotatable disks, and adjustable fastening means securing said disks together for simultaneous rotation, adjustment of said fastening means preloading said fastening means with an unbalance in stresses on portions thereof, rotation of said disks subjecting said fastening means to the effect of a centrifugal force substantially relieving said fastening means portions of said unbalance in stresses.

4. An axial flow turbine having a plurality of axially spaced rotatable rotor stages, and means securing said plurality of stages together for joint rotation, each of said stages having a plurality of apertures therein, the apertures of adjacent stages being axially aligned, and means insertable through said apertures of the different stages connecting said stages together, said means comprising nut and bolt means, the tightening of said nut means creating an unbalance in the stresses induced in said bolt means, rotation of said stages and said bolt means creating a centrifugal force thereon substantially relieving said bolt means of said unbalance in stresses.

5. A turbine rotor including a plurality of axially spaced rotatable disks each having a plurality of circumferentially spaced baled members thereon, and means securing said disks together for simultaneous rotation, said means comprising tie-bolts and fastening nuts cooperating therewith, said disks each having a plurality of apertures therein, said tie-bolts being insertable through the apertures of adjacent stages into engagement with said nuts, adjustment of said nuts stressing said tie-bolts and creating an unbalance in the stresses induced therein, rotation of said disks and said tie-bolts creating a centrifugal force on said tie-bolts substantially relieving said tie-bolts of said unbalance in stresses.

6. An axial flow turbine comprising a plurality of axially spaced rotor stages each having a plurality of circumferentially spaced blade members thereon, a drive shaft, means securing each of said stages to said shaft, each of said stages having a plurality of circumferentially spaced apertures therein for the insertion therethrough of stage connecting means, the apertures of adjacent stages being axially aligned, and means connecting said stages together, said means comprising tie-bolt means insertable through the apertures of several stages, adjustable fastening means secured to one end of said tie-bolt means for securing said stages together, adjustment of said adjustable means stressing said tie-bolt means and creating an unbalance in the stresses induced therein, rotation of said blade members rotating said turbine stages and said tie-bolt means and said shaft creating a centrifugal force on said tie-bolt means substantially relieving said tie-bolt means of said unbalance in stresses.

7. A turbine rotor for a gas turbine engine of the axial flow type having a plurality of axially spaced rotatable disks each provided with a plurality of circumferentially spaced blade members thereon, comprising connecting means connecting each of said disks to each other for simultaneous rotation, each of said disks having a plurality of circumferentially spaced apertures therein adapted to receive said connecting means, the apertures of adjacent disks being axially aligned, said connecting means comprising bolt and adjustable nut means, said bolt means being insertable through the apertures of adjacent disks into engagement with said adjustable nut means, the tightening adjustment of said nut means deforming and stressing said bolt means, said deformation of said bolt means creating an unbalance in the stresses induced therein, rotation of said disks and said bolt means subjecting said bolt means to the effect of a centrifugal force returning said bolt means substantially to its original undeformed shape.

8. A turbine as in claim 7 wherein said bolt means in its unstressed shape is bent, the tightening adjustment of said nut means substantially straightening said bolt means, the effect of said centrifugal force returning said bolt means to substantially its original bent shape.

9. A turbine as in claim 7 wherein said bolt means is provided with an axially extending projection on one portion thereof adapted to abut the face of one of said disks, other means rotatably mounted on said bolt means and cooperating with said nut means, said other means also having an axially extending projection thereon adapted to abut the face of another of said disks, said bolt means in its original shape being substantially straight, adjustment of said nut means effecting a deformation and unbalanced stressing of said bolt means upon abutment of said projections with said disks, the effect of said centrifugal force acting on said bolt means returning said bolt means to substantially its straight shape substantially relieving said bolt means of said unbalance in stresses.

10. A turbine as in claim 7, wherein each of said disks is provided with axial projections adapted to cooperate with said nut means and the head on said bolt means, the adjustment of said nut means by tightening movement on said bolt means bending and stressing said bolt means from its original substantially straight shape, said bending creating an unbalance in the stresses induced in said bolt means, the effect of said centrifugal force on said bolt means bending the bolt means back to its original substantially straight shape and substantially relieving said bolt means of said unbalance in stresses.

References Cited in the file of this patent

UNITED STATES PATENTS

| 1,770,932 | Leake | July 22, 1930 |
| 2,382,139 | Cueni | Aug. 14, 1945 |
| 2,621,018 | Barrett | Dec. 9, 1952 |
| 2,650,017 | Pedersen et al. | Aug. 25, 1953 |
| 2,774,566 | Richardson | Dec. 18, 1956 |